United States Patent [19]
Leonard

[11] 3,884,112
[45] May 20, 1975

[54] KEY SIGNATURE STRUCTURE TEACHING AID

[76] Inventor: Verna M. Leonard, 8701 Hwy. 41, Fresno, Calif. 93710

[22] Filed: July 24, 1974

[21] Appl. No.: 491,254

[52] U.S. Cl. ................................................ 84/471
[51] Int. Cl. .......................................... G09b 15/02
[58] Field of Search ............................ 84/470–475, 84/477 R, 483

[56] References Cited
UNITED STATES PATENTS

| | | | |
|---|---|---|---|
| 68,287 | 8/1867 | Catlin | 84/471 |
| 236,896 | 1/1881 | Knapp | 84/474 |
| 1,569,328 | 1/1926 | Logan | 84/474 |
| 3,129,628 | 4/1964 | Hall | 84/474 X |

FOREIGN PATENTS OR APPLICATIONS

| | | | |
|---|---|---|---|
| 539,044 | 11/1931 | Germany | 84/471 |

Primary Examiner—Stephen J. Tomsky
Assistant Examiner—John F. Gonzales
Attorney, Agent, or Firm—Ralph S. Branscomb

[57] ABSTRACT

The invention is an aid in teaching the music student that all key signatures in music are basically identical aside from the notes of one being uniformly higher or lower in pitch than the notes of another. The manifestation of this fact on a musical staff is pointed out by the use of a system of note nomenclature that remains unchanged for the scale progressions of all key signatures, as contrasted to the normal method of lettering the individual scale tones.

Structurally the device comprises one or more panels, each displaying a musical staff and being alternatively insertable into a open-topped pocket having an aperture or window in the front to expose the staff. The front of the pocket has markings on both sides of the window registering with and naming the lines and spaces of the staff according to standard practice, and a plurality of selectively exposable panel pairs mounted on the opposite sides of the pocket front adjacent these markings name the lines and spaces as the scale degrees of a particular key signature, the key signature being identified on each pair of panels.

A rotatable disc may be provided above the pocket which has a spaced angular display of the progressive notes of a scale in at least one key signature and the associated scale degrees.

5 Claims, 4 Drawing Figures

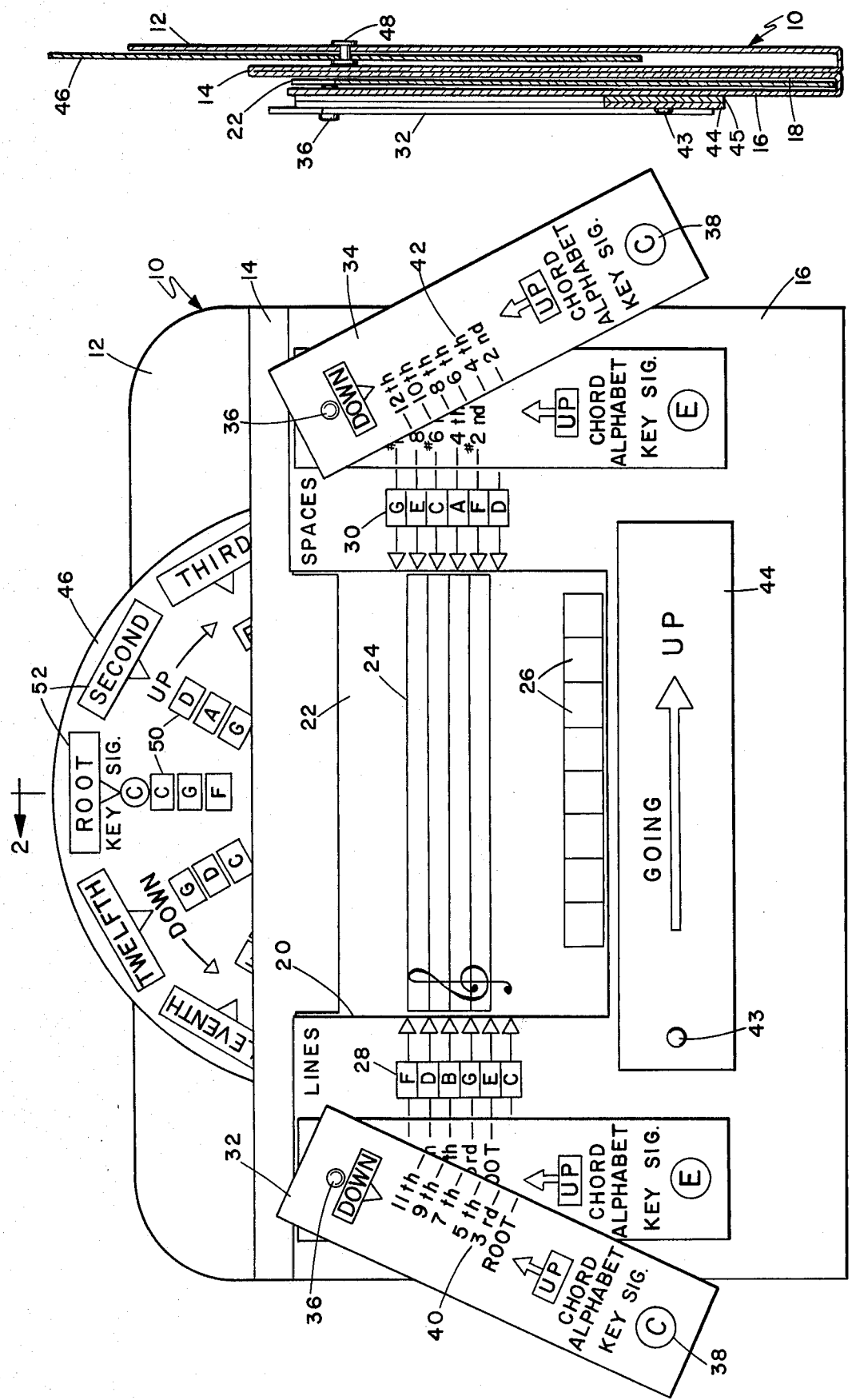

KEY SIGNATURE STRUCTURE TEACHING AID

BACKGROUND OF THE INVENTION

Frequently the beginning student is introduced to music by being exposed to written music on a staff in a variety of key signatures. The student is told which notes on the staff are associated with which keys on the instrument he is to play and then instructed to play the piece from the written music.

Written music in different key signatures appears as a morass of notes and chords on a staff, and the relationship between the different key signatures appears to be non-existent or extremely complex, with individual notes appearing in more than one key signature and different key signatures having various sharps and flats.

In reality there is one basic musical scale, which is simply duplicated at different pitches to produce the variety of key signatures, and this fact would be of enormous utility in simplifying the understanding of the key signature concept. Unfortunately, all too often the beginner is not appraised of this and is forced to memorize the notes in all the key signatures and grapple with music on a note by note level.

SUMMARY OF THE INVENTION

The present invention graphically exposes the simple key signature arrangement by contrapositioning a system of note nomenclature that is identical for every key signature with the conventional letter-naming of the notes.

Specifically, an insert panel displaying a musical staff is provided which is insertable into a pocket in a base member so that the staff lines and spaces are aligned with fixed indicia on the front of the pocket identifying the lines and spaces by their letter names. Besides the indicia are a plurality of selectively exposable panel pairs naming the lines and spaces not in accordance with the lettering system, but in accordance with the interval of the line or space from the root tone of the key signature. Each pair of the panels is associated with a different key signature, and thus begins the numbering of the scale degrees (interval from the root tone) on a different line or space, but a particular type of chord or interval would have a single expression in the scale degree naming system which remains the same in any key signature.

In addition, a rotatable disc having an annular display of the scale tones and associated scale degrees in one or more key signatures may be rotatably mounted to the base.

BRIEF DESCRIPTION OF THE DRAWINGS

FIG. 1 is a front elevation view of the device:

FIG. 2 is a section taken along 2—2 of FIG. 1.

DESCRIPTION OF THE PREFERRED EMBODIMENT

Figure 3:
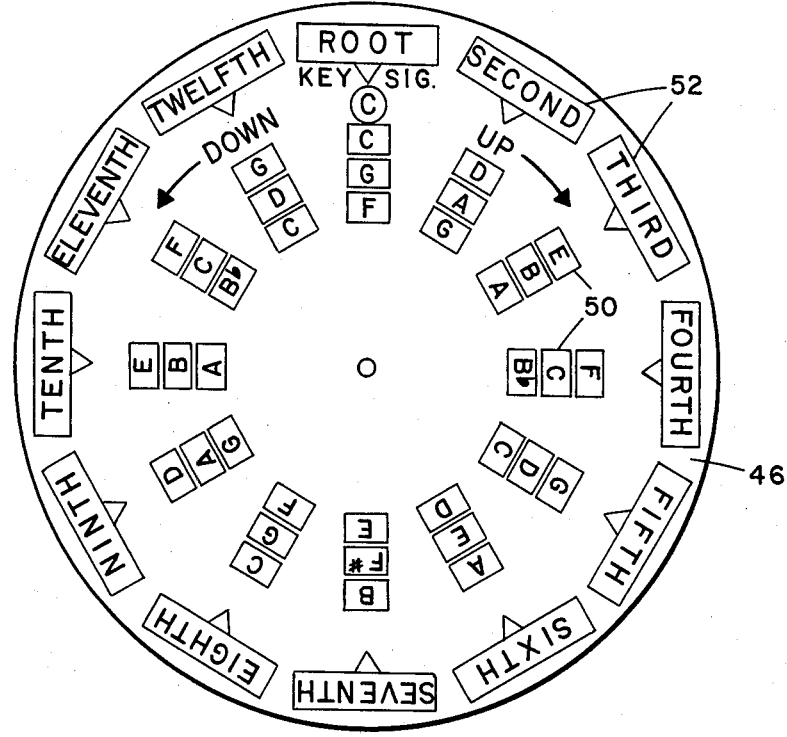
FIG. 3 is a full front elevational view of the disc partially revealed in FIG. 1.
Figure 4:
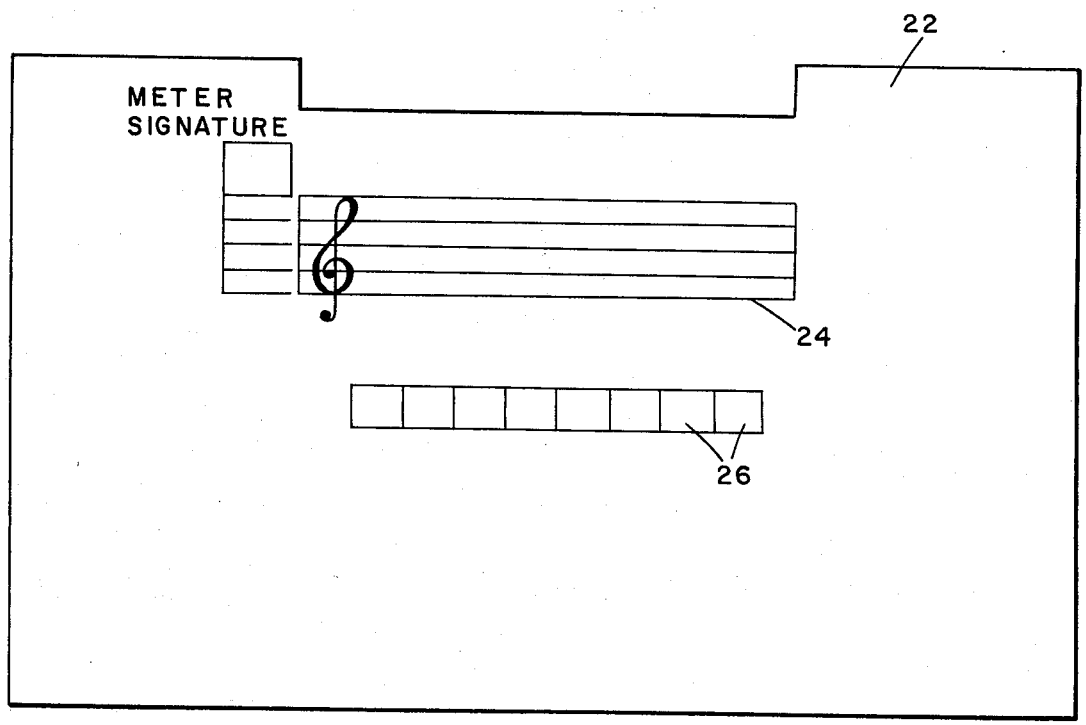
FIG. 4 is a front elevational view of a typical panel used in the device.

The invention comprises a base 10, which may be a quadruple-folded sheet of stiff paper, as illustrated in FIG. 2, having an upstanding rear panel 12, a center fold 14 and a front member 16 which together with the center fold defines an upwardly open pocket 18. The pocket front 16 has a parallel-sided aperture or window 20.

An insert panel 22, which is preferably one of a set of similar panels, displays a musical staff 24 and below the staff a row of empty boxes 26 to be used as writing spaces. On the pocket front 16 are two groups of indicia 28 and 30, adjacent the window 20, which comprise arrows which align with the lines and spaces, respectively, of the staff 24 when the insert panel is seated in the pocket. Indicia 28 and 30 also name the lines and spaces by letter, as shown in FIG. 1.

Alongside the indicia 28 and 30 are two groups of panels 32 and 34 which are selectively exposable, as by being mounted to the member 16 by brads 36 to permit pivoting of each panel to expose the next. The panels come in pairs associated with a single key signature, and may be provided in any number. The foremost panel pair is identified at 38 with the key of "C" in FIG. 1. The panels are provided with indicia 40 and 42, respectively, which indicate the scale degrees of the notes falling on the lines and spaces of the staff 24 in the chosen key signature. The purpose of this wll be made clear in the following example.

Should the student decide to work in the key of "E," the second panel pair would be exposed as shown. The scale progression of the key of "E" would be written as notes on the blank staff 24, beginning on the line identified as "E" by the indicia 28, and as "root" by the indicia 32. Any other chord, intervals, or progressions in the key of "E" may also be inscribed on the staff, and all times the user can relate the notes and chords to the root tone of the key signature rather than, or in addition to, the conventional lettering system.

The advantage of this lies in the fact that the student now has a system of nomenclature which is identical in every key signature even though the letter naming of the individual notes will vary. For example, a major chord comprises the Root, third, and fifth scale degrees of the scale in any key signature. By switching from one key signature to another and inscribing the notes of various chords and progressions on the staff 24, it becomes clear to the student that the entire chord and interval structure for one key signature is identical to all others except for a uniform raising or lowering of pitch, which is revealed by the changing of the letter names of the notes on the staff.

As an additional aid to the use of the device, a pair of direction indicating-panels may be mounted by a rivet 43 to the pocket front beneath the window 20, one indicating that the scale to be written on the staff goes up to the right, this panel being shown at 44 in FIG. 1, and the second panel 45 being similar to panel 44, mounted behind it (not shown) and exposable in the alternative to indicate a decreasing scale toward the right. One of these panels can be selected by the student prior to inscribing a scale on the staff to indicate whether he is to work with an increasing or decreasing scale.

It will be clear that for practical reasons more than one of the insert panels 22 should be provided so that extensive practice may be had in all key signatures. The panels may not be identical, it being preferred that the staffs on some of them be geared to the bass cleff, and some possible being vertically divided to accomodate an increasing scale progression on one side and a decreasing progression on the other. The writing spaces 26 may be used to inscribe the names of the scale tones of the notes written on the staff.

Mounted to an upper portion of the rear panel 12 is a dial or disc 46 which is centrally pivoted on a rivet 48. A substantial upper portion of the dial is exposed behind the center fold 14.

The dial is provided with an angularly spaced array of indicia 50 comprising twelve consecutive scale tones in one or more key signatures. Three key signatures are illustrated in the dial shown in FIGS. 1 and 3, namely C, G, and F. Further indicia 52 are provided indicating what scale degree each of the scale tones is in the particular key signature.

The key signatures represented on the dial preferably are the same as those identified on the panels 32 and 34, and are used in conjunction with the panels to reiterate the common scale degree system of nomenclature for all key signatures.

I claim:

1. A device for teaching key signature structure comprising:

A base having an upwardly extending rear panel and defining a forwardly disposed upwardly open pocket;

said pocket having a planar front member with a portion thereof cut away to define an aperture with a parallel-sides;

an insert panel having displayed thereon a musical staff and being insertable in said pocket such that said musical staff is revealed through said aperture;

said planar front member having indicia adjacent the parallel sides of said aperture registering with and naming the scale tones of the lines and spaces of the musical staff when said insert panel is inserted; and a plurality of selectively exposable panel pairs mounted on said planar front member, the panels of each pair being identified with a particular key signature and the first panel in each pair being disposed on one side of said aperture and having indicia thereon to register with the lines of said staff to identify same as the scale degrees of the particular key signature, and the second panel of each pair being disposed on the side of said aperture opposite said one side and having indicia thereon to register with the spaces of the staff to identify same as the scale degrees of the particular key signature.

2. Structure according to claim 1 wherein said insert panel is one of a set of similar panels which are alternately insertable into said pocket for the inscription on the staffs displayed thereon of the notes of a musical scale.

3. Structure according to claim 2 wherein each insert panel of said set is provided with a plurality of blank spaces beneath the staff and accessible through said aperture for the inscription of the names of notes inscribed on the staff.

4. Structure according to claim 3 and including a pair of selectively exposable directional panels mounted to said base beneath said aperture and each having thereon an arrow pointing to the right;

one of said directional panels having indicia thereon to indicate that the notes to be inscribed on said staff go up toward the right, and the other indicating the notes to be inscribed on said staff go down toward the right, whereby the user of the teaching aid can unambiguously pre-select either an ascending or a descending scale.

5. Structure according to claim 1 and including a rotatable disc mounted on an upper portion of said upwardly extending rear pannel and being at least partially exposed above the planar front member of said pocket;

said disc having at least one array of angularly spaced indicia naming in order the scale tones of a key signature identical to the key signature identified on one of said panel pairs; and said scale tones being further identified as to their scale degrees in the key signature.

* * * * *